United States Patent [19]

Bruce, Jr.

[11] 4,409,653

[45] Oct. 11, 1983

[54] METHOD OF PERFORMING A CLEAR AND WAIT OPERATION WITH A SINGLE INSTRUCTION

[75] Inventor: William C. Bruce, Jr., Austin, Tex.

[73] Assignee: Motorola, Inc., Schaumburg, Ill.

[21] Appl. No.: 239,269

[22] Filed: Mar. 2, 1981

Related U.S. Application Data

[63] Continuation of Ser. No. 929,629, Jul. 31, 1978, abandoned.

[51] Int. Cl.³ .............................................. G06F 9/46
[52] U.S. Cl. ................................................. 364/200
[58] Field of Search ....................................... 364/200

[56] References Cited

U.S. PATENT DOCUMENTS

| | | | |
|---|---|---|---|
| 3,286,240 | 11/1966 | Thompson et al. | 364/200 |
| 3,614,740 | 3/1970 | Delagi et al. | 364/200 |
| 3,614,742 | 10/1971 | Watson et al. | 364/200 |
| 3,771,146 | 11/1973 | Cotton et al. | 364/200 |
| 3,789,365 | 1/1974 | Jen et al. | 364/200 |
| 3,825,902 | 7/1974 | Brown et al. | 364/200 |
| 3,898,623 | 8/1975 | Cormier | 364/200 |
| 4,103,327 | 7/1978 | Dimmick | 364/200 |
| 4,106,091 | 8/1978 | Hepworth et al. | 364/200 |
| 4,115,852 | 9/1978 | Rozell | 364/200 |

*Primary Examiner*—Raulfe B. Zache
*Attorney, Agent, or Firm*—Anthony J. Sarli, Jr.; Joe E. Barbee; Jeffrey Van Myers

[57] ABSTRACT

A method for performing a clear interrupt mask bit and wait operation in response to a single instruction. In responding to the clear and wait instruction a processor clears a condition code register, if desired, and then stacks a plurality of registers. Once the registers are stacked the processor is prepared to assume a wait for interrupt mode and will not respond to any other instruction until an interrupt occurs.

5 Claims, 3 Drawing Figures

METHOD OF PERFORMING A CLEAR AND WAIT OPERATION WITH A SINGLE INSTRUCTION

This is a continuation of application Ser. No. 929,629, filed July 31, 1978, now abandoned.

RELATED APPLICATIONS

Related applications are Ser. No. 929,482 and Ser. No. 929,636 now U.S. Pat. No. 4,200,912 filed on the same day as the present application and assigned to the same assignee.

BACKGROUND OF THE INVENTION

This invention relates, in general, to digital processors, and more particularly, to a method for providing a clear and wait instruction for a digital processor.

In the operation of digital processors it is often desirable to have the digital processor system stop processing instructions and to wait upon an input from an external peripheral device. Often before having the processor system wait upon the external input it is desirable to clear one or more bits in the status or condition code register. In the past, some digital processors had a simple wait instruction which would allow the processor to wait for an external input while yet other processors would stack certain preselected registers and then wait for an external input. In such a situation if it was desired to change or clear a bit in the condition code register then a separate instruction had to be executed to make the change to the contents of the condition code register.

There are disadvantages in a digital processor requiring two separate instructions to perform a clear and wait function. In particular, if a digital processor is executing a clear instruction and an external input or interrupt occurs then upon the completion of the clear instruction, the digital processor will service the interrupt and upon executing the return from interrupt instruction the processor will then execute the wait instruction. However, if the interrupt that was serviced upon the completion of the clear instruction was the interrupt that the machine was being prepared to wait for then the machine would remain in the waiting mode until an operator intervened. One way to avoid such a problem was to extend the clear instruction by one clock cycle so that an interrupt would not be responded to between the clear and the wait instruction. However this solution could create other problems.

Accordingly, it is an object of the present invention to provide a digital processor capable of performing a clear and wait operation in response to a single instruction.

BRIEF SUMMARY OF THE INVENTION

In carrying out the above and other objects of the invention in one form, there is provided a method for performing the clear and wait operation with a single instruction in a digital processor system. Contents of a storage location are logically ANDed with contents from a condition code register. The condition code register contains the status of the processor including at least one mask bit of an interrupt which the processor is capable of responding to. A plurality of registers are stacked so that the contents of the registers will not be destroyed while responding to an external input. Once the registers are stacked the digital processor then waits for an external input or interrupt signal.

DESCRIPTION OF A PREFERRED EMBODIMENT

Figure 1:
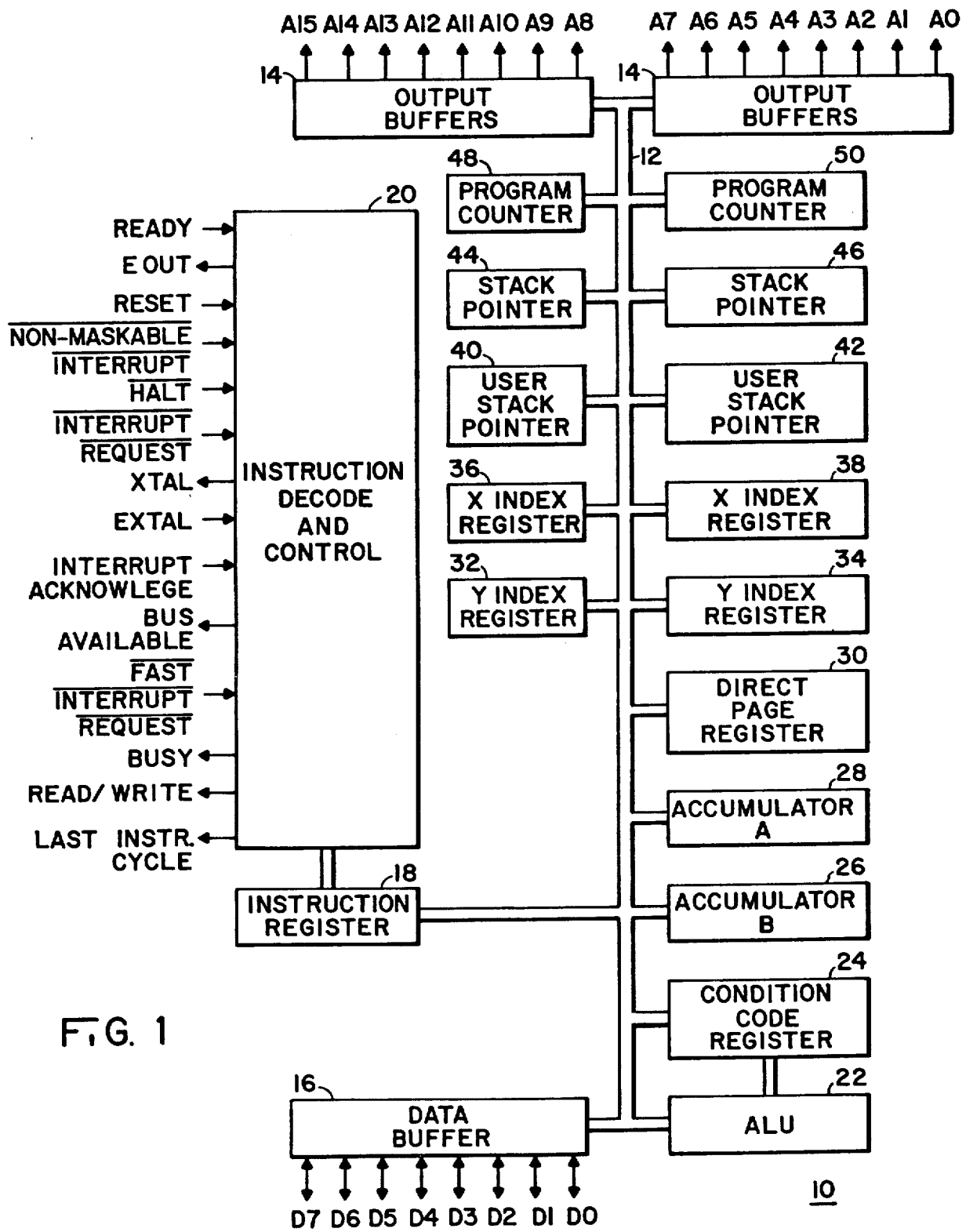
FIG. 1 shows a block diagram of a processor capable of carrying out the present invention.

FIG. 1 shows a microprocessor device 10 having a bus 12 for carrying address information or data. Connected to the bus 12 are output buffers 14 which are used to buffer addresses to provide addresses for memory or peripheral devices, not shown, external to the processor itself. Also connected to bus 12 is a data buffer 16 which is 8-bits wide in a preferred embodiment and the function of which is to buffer data from the internal bus 12 to devices external to the microprocessor on the eight lines D0–D7 as shown. The data buffer lines are bidirectional so that data can be transmitted or received through the same data buffering unit 16.

When instructions are received from an external device they are buffered by data buffer 16 and applied to an instruction register 18 and the instructions are decoded by an instruction decoder 20 which also provides and receives control signals. The internal control signals of the device 10 are not shown for clarity of description. Also connected to bus 12 are an arithmetic and logic unit 22 having a condition code register 24 associated therewith. Two accumulators 26 and 28 are provided connected to the bus 12 and arranged such that the two accumulators, which in a preferred embodiment are 8-bits each, may form a 16-bit accumulator which is referred to as accumulator D. The bus also has associated with it a direct page register 30, which is also an 8-bit register. A Y index register has a high 8-bit segment 32 and a low 8-bit segment 34 connected to the bus 12 to form a 16-bit Y index register. Similarly, an X index register has a high 8-bit segment 36 and a low 8-bit segment 38 to form a second 16-bit index register. Two stack pointers are provided each having high and low order segments, the user stack pointer having a high 8-bit segment 40 and a low 8-bit segment 42. A hardware stack pointer has a high 8-bit segment 44 and a low 8-bit segment 46 to provide a 16-bit hardware stack pointer; and a program counter has a high 8-bit segment 48 and a low 8-bit segment 50 to provide 16-bits of address which may be applied through output buffers 14 to provide a 16-bit address to devices external to the microprocessor 10.

A plurality of control signals are provided to the instruction decode and control unit 20 including a ready signal, an E (clock) signal which allows the clock of the device 10 to be provided to external system elements for synchronization. A reset pin is provided to initialize device 10 and two interrupt lines provide an interrupt request, and a nonmaskable interrupt to the control unit 20. A halt pin is provided for halting the operation of the machine upon external control. The terminals are provided for connection to a crystal (XTAL and EXTAL). Interrupt acknowledge and bus available signals are also provided to and from the control device 20 as shown in the Figure. A third interrupt signal FIRQ (fast interrupt request) is provided to perform specialized interrupts as will be discussed later. A busy signal is provided from the control device 20 to allow utilization of device 10 in a multiprocessing environment. A read-/write signal is provided to direct the reading or writing of data to or from a device external to the device 10. Another signal, last instruction cycle, is provided to indicate to external hardware that the subsequent data on the data bus is a machine operation code. Two other connections to device 10 are not specifically shown but are $V_{DD}$ and $V_{SS}$, the power supply pins, which in a preferred embodiment may be +5 and 0 volts.

It can be seen that the register arrangement of device 10 utilizes a plurality of 16-bit registers as described, and these 16-bit registers allow the performance of operations on 16-bits of data in parallel. The 8-bit registers including the accumulators are used for routine computation and byte-oriented data manipulations, such as editing, interpreting, compiling, and so on, and have the advantage of providing efficient byte-oriented operations which may be more difficult to handle if all registers in the system were 16-bits wide.

As previously noted, the two 8-bit accumulators can be used to form one 16-bit accumulator for double byte operations, thus giving the flexibility of being easily available for either 8-bit or 16-bit operation.

All registers associated with memory-referenced operations (the X and Y index registers, the user and hardware stack pointers ) are all 16-bits wide.

Digital processor device 10, because of the register arrangement and other internal features, may perform long relative branches, program-counter relative addressing, and indirection. There is a provision for automatic increment or decrement by one or two to provide easy access to tabular data or to data buffers.

Some of the 16-bit instructions manipulate data in the two accumulators and others manipulate addresses in the index registers or stack pointers.

The "load effective address" instruction allows a programmer to add immediate values or an accumulator to an index register.

A plurality of long branch instructions are described, which are capable of reaching any location in memory. Several high-speed instructions which push or pull a selectable set of registers are provided which facilitate argument passage to and from subroutines, for example, and allow subroutines to save sets of registers at invocation and restore the same set before exit.

The transfer and exchange instructions give processor 10 flexiblity and consistency by allowing any register to be transferred or to be exchanged with any like sized register.

The device also includes an unsigned 8-bit by 8-bit multiply with a 16-bit product. The multiply is unsigned to facilitate the generation of multiprecision products. In addition to its use for numerical calculations, the multiply function is useful in calculating array subscripts for programs written in high-level languages.

The auto increment and auto decrement instructions allow data movement and block comparisons in conjunction with memory reference instructions. A SYNC instruction is provided for high-speed synchronization of hardware and software. By stopping the processor and allowing it to start only when a interrupt line is activated or pulled low, the instruction provides a mechanism for synchronizing software with hardware external to processor 10 without the delays associated with interrupts or busy-wait loops.

Among the control signals, the ready input signal is provided for slow memory and multiprocessor management. Additionally, a busy signal is made available during read-modify-write operations for disabling other processors in multiprocessing systems. This busy signal, which allows system hardware exclusion from the start of the read cycle through the associated write interval, assures that updated data will be processed throughout the system.

The maskable fast interrupt pin on processor 10 generates a fast interrupt response for special priority interrupts. This interrupt (FIRQ) causes the stacking of only the return addresses and condition code. Using only one instruction, a designer may stack all additional registers that must be protected. Moreover, an acknowledgement signal is available during any vector-fetch so that the interrupting device may directly specify the starting address of the associated interrupt handling routine.

Figure 2:
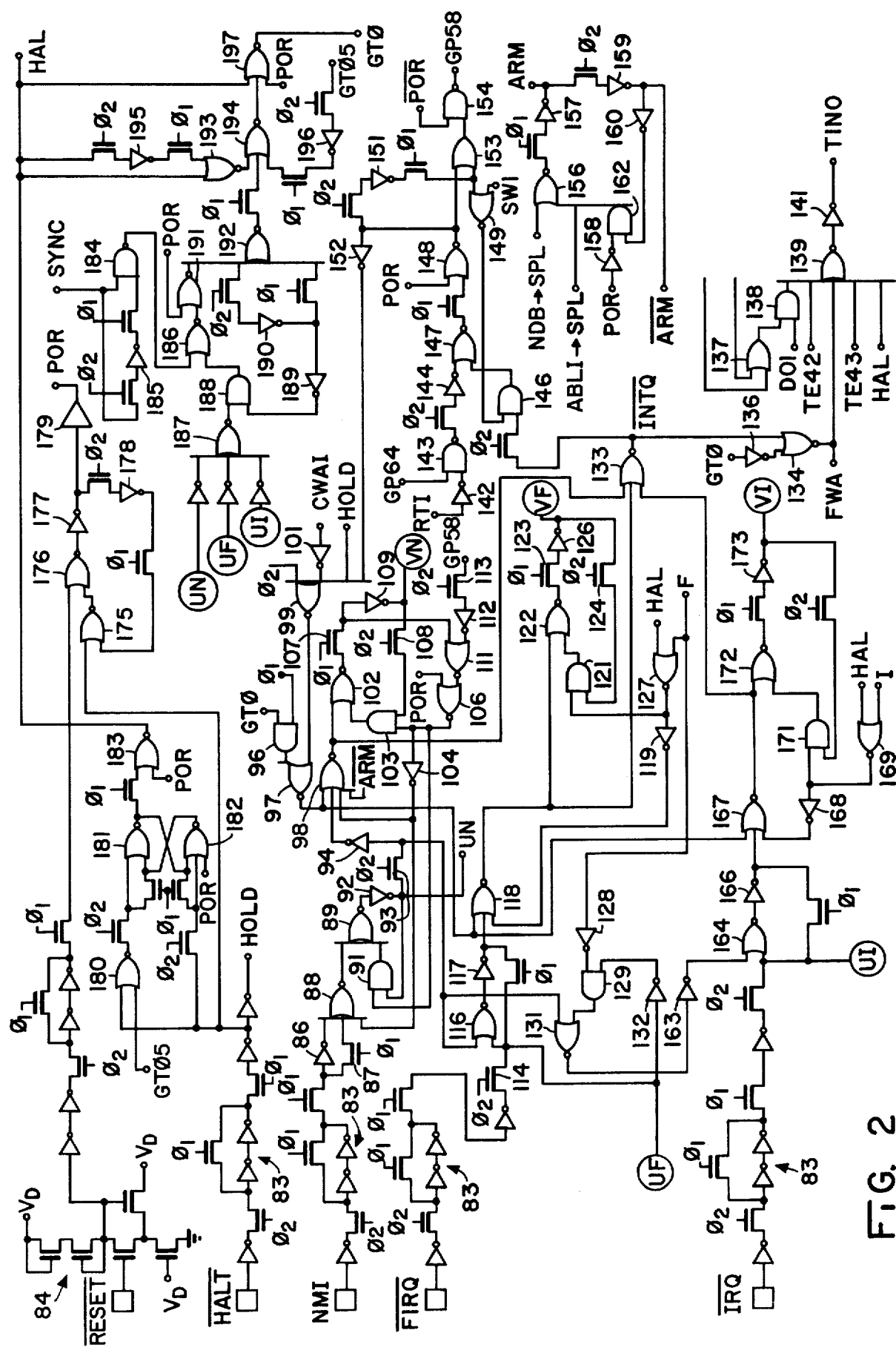
FIG. 2 illustrates in logic diagram a portion of the processor shown in FIG. 1 useful in understanding the present invention.

In FIG. 2, five of the interface pins for processor 10 are shown. These five interface pins receive input signals reset (RESET), halt (HALT), non-maskable interupt (NMI), fast interrupt request (FIRQ), and interrupt request (IRQ) and all are zero active or in other words the complements of the signals are received. The reset input comes into a series of field effect transistors 84 which serves to reduce the effects of transients that may accompany the signal. The reset signal is coupled from field effect transistors 84 by two inverters and a gated field effect transistor into a synchronizing latch. The output of the synchronizing latch is coupled to a capture circuit formed by NOR gates 175, 176 and inverters 177, 178. The output of the capture circuit is buffered by non-inverting amplifier 179 and is then called power on reset (POR). POR is used throughout processor 10 to perform reset functions.

Halt, non-maskable interrupt, fast interrupt, and interrupt request all are passed through synchronization circuits 83 before being used by processor 10. Each synchronization circuit 83 includes two series inverters having the output connected back to the input by a field effect transistor which is gated or enabled by phase 1 ($\emptyset 1$) of the clock signal for processor 10. Other field effect transistors couple the input and the output of the latches and are enabled by both phase 1 ($\emptyset 1$) and phase 2 ($\emptyset 2$) of the clock cycle for processor 10.

An output from the halt synchronization circuit 83 is coupled to NOR gate 175 so that the capture circuit can capture a reset signal during halt. If a reset should occur during the presence of a halt signal the capture circuit serves to capture the reset signal so that the reset can be performed upon removal of the halt signal. The output of the halt synchronization circuit 83 is also coupled to an input of NOR gate 180. Also coupled to an input of NOR gate 180 is a signal, GT$\emptyset 5$, indicating that the last cycle of an instruction has been performed. The output of NOR gate 180 is coupled by a field effect transistor, which is enabled by phase 2 of the clock cycle, into one of the inputs of NOR gate 181. NOR gate 181 is interconnected with NOR gate 182 to form a flip-flop latch. One of the inputs for NOR gate 182 is power on reset, POR. The output of NOR gate 181 is coupled to another of the inputs of NOR gate 182 and also coupled to an input of NOR gate 183. A second input of NOR gate 183 is power on reset. The output of NOR gate 183 is coupled to a first input of NOR gate 193 and to a second input of NOR gate 193 by inverter 195 and two transistors enabled by $\emptyset 1$ and $\emptyset 2$. The output of NOR gate 193 is connected to an input of NOR gate 194. The output of NOR gate 194 serves as an input for NOR gate 197. In addition, NOR gate 197 has as an input power on reset and also the output of NOR gate 183. The output of NOR gate 197 serves as a signal (GT∅) to indicate the beginning of an op code fetch cycle. An input for NOR gate 194 is the signal (GT∅5), indicating the last cycle of an instruction, and is coupled by inverter 196 and two gated transistors. A third input to NOR gate 194 is coupled by a transistor from NOR gate 192. One input of NOR gate 192 comes directly from NOR gate 191 while the other input is coupled from gate 191 through two field effect transistors and inverter 190. Power on reset is one input for NOR gate 191 while the other input comes from NOR gate 186. NOR gate 186 receives an input from AND gate 184. AND gate 184 receives a SYNC instruction input on one input, and the other input receives an inverted SYNC input which is coupled through inverter 185 and two field effect transistors. A second input for NOR gate 186 comes from AND gate 188. One input of AND gate 188 is coupled from the output of NOR gate 191 by one field effect transistor and two inverters 189, 190. A second input for AND gate 188 comes from NOR gate 187 which has three inputs UN, UF, and UI which are coupled by inverters and indicate that an interrupt has been received. AND gate 188, NOR gates 186, 191, and inverters 189, 190 form a sync latch circuit. Inputs UN, UF, and UI serve to remove a SYNC instruction input by clearing the sync latch.

The non-maskable interrupt signal, NMI, is coupled by its synchronization circuit 83 into an inverter 86 whose output is connected to an input of NOR gate 88. A second input of NOR gate 88 is the output from synchronization circuit 83 coupled by field effect transistor 87. The purpose of inverter 86 and NOR gate 88 is to form an edge detector circuit to generate a pulse from the non-maskable interrupt signal. The output of NOR gate 88 is coupled to an input of NOR gate 89. The output of NOR gate 89 is coupled by inverter 92 to an input of AND gate 91. The output of AND gate 91 serves as a second input for NOR gate 89. The output of inverter 92 is also coupled by field effect transistor 93 to an input of NOR gates 116, 131, to inverter 94, and is coupled by an inverter to an input of NOR gate 187. The output of inverter 94 goes to an input of NOR gate 98. Another input for NOR gate 98 comes from NOR gate 97. One input for NOR gate 97 comes from AND gate 96 which has two inputs, phase 1 clock input and the output, GT∅, from NOR gate 197. A second input for NOR gate 97 comes from NOR gate 99. NOR gate 99 has as an input phase 2 clock signal, clear wait signal (CWAI) coupled by inverter 101, an inverted halt signal (HOLD), and the output from inverter 152.

Now another input to NOR gate 98 is from inverter 104. NOR gate 98 also receives an input (ARM) from inverter 159 which serves to inhibit NOR gate 98 following reset and prior to the stack being loaded. The output of NOR gate 98 goes to NOR gate 133 and to NOR gate 102. Nor gate 102 also receives an input from AND gate 103. The output from NOR gate 102 is coupled by field effect transistor 107, inverter 109, and field effect transistor 108 to an input of AND gate 103. A second input for AND gate 103 comes from NOR gate 106. The output, VN, from inverter 109 serves as the vector request latch output, VN, for the non-maskable interrupt. An input signal, GP58, indicating that processor 10 is processing an instruction is coupled into inverter 112 by field effect transistor 113. The input to inverter 112 serves to reset the NMI latch formed by NOR gate 102, AND gate 103, and inverter 109. This input signal thereby prevents a non-maskable interrupt from occurring in the middle of an instruction cycle. The output of inverter 112 goes to an input of NOR gate 111. A second input for NOR gate 111 comes from the output of NOR gate 102 which is coupled by field effect transistor 107. The output of NOR gate 111 goes to an input of NOR gate 106, and power on reset, POR, serves as a second input for NOR gate 106.

A fast interrupt request (FIRQ) is coupled by synchronization circuit 83 and field effect transistor 114 into a first input of NOR gate 116. This input serves as the unmasked fast interrupt input, UF, and is coupled by inverter 132 to an input of AND gate 129, and is also used as an input to NOR gate 187. The input that goes to NOR gate 187 is coupled by an inverter and serves to clear the sync latch when a fast interrupt request is received. The output of NOR gate 116 is coupled by inverter 117 and by a field effect transistor, which is gated on by phase 1 of the clock signal, back into the first input of NOR gate 116. The output of inverter 117 also goes to an input of NOR gate 118. NOR gate 118 also receives inputs from NOR gate 97 and from inverter 119. The output of NOR gate 118 goes to an input of NOR gate 122, and a second input for gate 122 comes from AND gate 121. The output of gate 122 is coupled by field effect transistor 123, inverter 126, and field effect transistor 124 to an input of AND gate 121. Field effect transistor 123 is enabled by phase 1 of the clock cycle while field effect transistor 124 is enabled by phase 2 of the clock cycle. AND gate 121, NOR gate 122, transistors 123, 124, and inverter 126 serve as a fast interrupt vector request latch and provide output VF. The mask bit, F, for the fast interrupt request from condition code register 24 (FIG. 1) serves as an input to NOR gate 127 and to inverter 128. A second input for NOR gate 127 is the halt signal, HAL. The output of NOR gate 127 goes to an input of AND gate 121 and to inverter 119. The output of inverter 119 serves as an input for NOR gate 118. The output of inverter 128 goes to an input of AND gate 129 and a second input to AND gate 129 is coupled by inverter 132 and field effect transistor 114 from synchronization circuit 83. A second input for NOR gate 131 comes from the priority circuit for the non-maskable interrupt request. The output of NOR gate 131 is coupled by inverter 163 to an input of NOR gate 164 and serves to inhibit an interrupt request (IRQ) when a nonmaskable interrupt (NMI) or a fast interrupt request (FIRQ) is present.

An interrupt request input (IRQ) is coupled by synchronization circuit 83 into an input of NOR gate 164. The output of NOR gate 164 is inverted by inverter 166 and coupled by a field effect transistor, enabled by phase 1 of the clock signal, back into an input of NOR gate 164. This input to NOR gate 164 also is coupled to an input of NOR gate 187 to terminate a sync instruction once an interrupt request (IRQ) is received. The output of inverter 166 also goes to NOR gate 167. A second input for NOR gate 167 comes from NOR gate 97. The output 167 goes to an input of NOR gate 172 and to an input of NOR gate 133. The output of NOR gate 172 is coupled by a field effect transistor, enabled by phase 1 of the clock signal, and by inverter 173 to form output VI. Logic gates 171, 172, the two field effect transistors, and inverter 173 serve the function of a vector request latch for the interrupt request input. The output of inverter 173 is also coupled by a field effect transistor, enabled by phase 2 of the clock signal, to an input of AND gate 171. The output of AND gate 171 serves as a second input for NOR gate 172. A second input for AND gate 171 comes from NOR gate 169. NOR gate 169 receives the halt input, HAL, and also receives an input, I, from condition code register 24 (of FIG. 1) indicating whether the interrupt request is masked or not. The output of NOR 169 also goes to an input of inverter 168 whose output serves as an input for NOR gate 167. NOR gates 98, 118, and 167 provide inputs to NOR gate 133. The output, $\overline{INTQ}$, of NOR gate 133 indicates whether an interrupt has been received by processor 10.

An output of NOR gate 133 is used as an input for NOR gate 134. An output, GT0, from NOR gate 197 is also coupled by inverter 136 as an input for NOR gate 134. The output of NOR gate 134 serves as an op code to force-a-wait (FWA). FWA is generated whenever an unmasked interrupt occurs provided that preceding the interrupt a clear-and-wait instruction (CWAI) has not placed the processor in a stopped state waiting for an interrupt. The FWA is used to tell processor 10 not to fetch the next op code from ROM but instead to generate a new op code in the processor itself.

OR gate 137, AND gate 138, NOR gate 139, and inverter 141 provide a toggle incrementer inhibit signal TINO which prevents the processor incrementer from incrementing when an interrupt is being serviced. OR gate 137, AND gate 138, and NOR gate 139 receive timing signals along with certain op codes to generate the proper time slot for TINO. OR gate 137 receives two op codes and provides an output which is used as one of the inputs for AND gate 138. The second input for AND gate 138 is a timing signal. OR gate 139 receives the output from AND gate 138, some timing signals, HAL, and FWA, and provides an output to inverter 141. Inverter 141 provides output TINO.

The output of NOR gate 133 is also coupled by a field effect transistor to an input of AND gate 146. The output of AND gate 146 serves as an input for NOR gate 147. NOR gate 147 also receives an input from NAND gate 143 which is coupled by a field effect transistor and inverter 144. NAND gate 143 has an input, GP64, indicating the end of an instruction, and also has an input coupled by inverter 142 which indicates a return from interrupt instruction (RTI). The output of NOR gate 147 is coupled by a field effect transistor to an input of NOR gate 148. A second input for gate 148 is power on reset (POR). The output of NOR gate 148 goes to inverter 152, a first input of OR gate 153, and is coupled by a field effect transistor enabled by phase 2 of the clock signal and inverter 151 and by a second field effect transistor enabled by phase 1 of the clock signal to a second input of OR gate 153. The output of OR gate 153 serves as an input for NAND gate 154. The second input of OR gate 153 also serves as an input for NOR gate 149. NOR gate 149 has a second input which is software interrupt (SWI). A second input for NAND gate 154 is $\overline{POR}$. The output, GP58, of NAND gate 154 indicates a particular cycle time of an instruction and is coupled to inverter 112 by field effect transistor 113. The output of NOR gate 149 goes to an input of AND gate 146. Logic gates 146, 147, 148, 149 along with inverter 151 and three field effect transistors form a latch for latching a clear-and-wait instruction (CWAI). The clear-and-wait latch is cleared upon receipt of an interrupt from an external device.

NOR gate 156, inverters 157, 159, 160, 158, and AND gate 162 form a non-maskable interrupt arm latch. NOR gate 156 receives two inputs indicating that the stack has been loaded, and inverter 158 couples POR to an input of AND gate 162.

Figure 3:
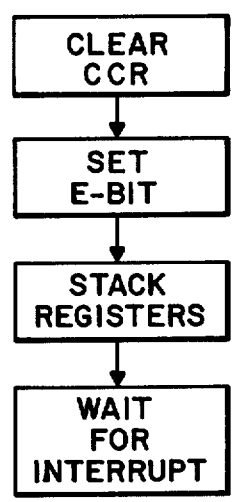
FIG. 3 illustrates in simplified block diagram form a method of practicing the present invention.

FIG. 3 illustrates a simplified flow diagram of the method of carrying out the present invention. The digital processor recognizes a clear and wait instruction, and in response thereto clears selected bits in the condition code register by ANDing the contents of the condition code register with contents from a storage location. Preferably the storage location is in a memory associated with the digital processor and its contents have been preselected to provide the desired results within the condition code register. It will be noted that with the proper selection of the contents in the storage location the contents of the condition code register may not be changed when the two are logically ANDed. On the other hand, one or all of the bits contained in the condition code register can be cleared or modified depending upon the contents of the storage location.

As explained in the related applications, which are hereby incorporated herein by reference, an E bit can be set in the condition code register of processor 10 to indicate that all the programmable registers are being stacked. This permits the processor to determine at the beginning of the return from interrupt instruction whether all of the registers must be unstacked. Once the E bit is set the registers are then stacked and the processor is now in condition for assuming the wait for interrupt mode. The processor will continue in the wait for interrupt mode until an interrupt occurs. When a non-masked interrupt occurs, no further machine state will be saved before vectoring to the interrupt handling routine.

A fast interrupt (FIRQ) will enter its interrupt handler with its entire processor state saved. The return from interrupt instruction will automatically return the entire processor state after testing the E bit of the recovered condition code register.

By now it should be appreciated that there has been provided a microprocessor having a single instruction for performing a clear and wait operation. This feature prohibits the processor from responding to a premature interrupt input.

What is claimed is:

1. A method of performing a clear and wait operation with a single instruction in a processor having a plurality of programmable registers including a condition code register, by performing the following steps in response to a clear and wait instruction ANDing an immediate byte with contents of the condition code register so that the condition code register may be cleared if desired, the immediate byte being obtained from a preselected memory location; inhibiting a non-maskable interrupt during the ANDing of the immediate byte with the contents of the condition code register; stacking the plurality of programmable registers to save the state of the processor at time of performing the clear and wait operation; and waiting for an interrupt to occur so the interrupt can be directly serviced, and returning the processor to normal program execution after servicing the interrupt, thereby having performed a clear and wait operation with a single instruction.

2. The method of claim 1 further including clearing preselected bits in the condition code register during the ANDing of the immediate byte with the contents of the condition code register.

3. A method of performing a clear and wait operation with a single instruction in a microprocessor having a plurality of programmable registers including a condition code register, the microprocessor being capable of responding to a plurality of interrupts, wherein one of the plurality of interrupts is a non-maskable interrupt, the method comprising: recognizing a single clear and wait instruction and in response to the single clear and wait instruction performing the following steps, inhibiting the non-maskable interrupt temporarily, clearing at least one bit in the condition code register while the non-maskable interrupt is inhibited, stacking the plurality of programmable registers, and waiting for an interrupt to occur so that the interrupt can be serviced.

4. A method of performing a clear and wait function by a single instruction in a digital processor having a plurality of stackable registers, the method of performing the following steps in response to the single instruction comprising: ANDing contents from a storage location with contents of a condition code register to be able to clear any of the contents of the condition code register, the storage location being in a memory associated with the digital processor; stacking the plurality of stackable registers to save the state of the processor; and waiting for an interrupt to occur so that the interrupt can be serviced by the processor.

5. The method of claim 4 further including clearing a predetermined bit in the condition code register during the ANDing of the contents of the condition code register with the contents from the storage location.

* * * * *